(No Model.)  2 Sheets—Sheet 2.
C. J. FAUVEL.
METHOD OF TREATING REFRACTORY ORES.
No. 503,839. Patented Aug. 22, 1893.
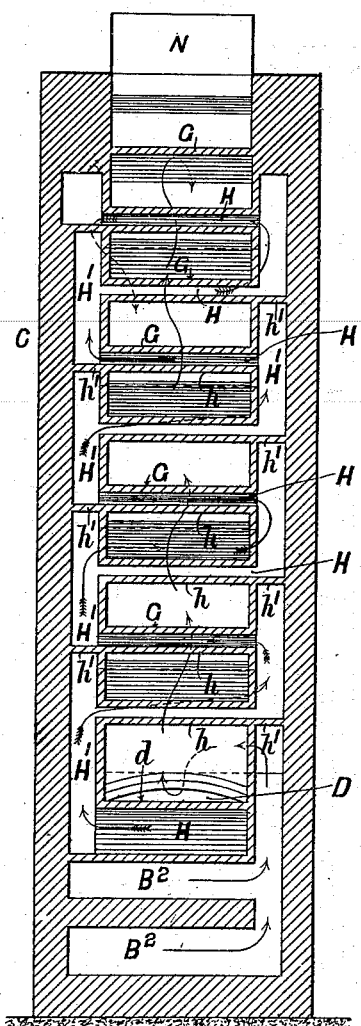
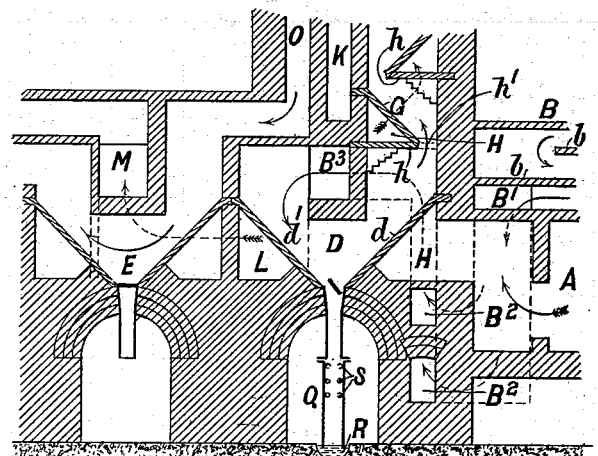
WITNESSES:  INVENTOR

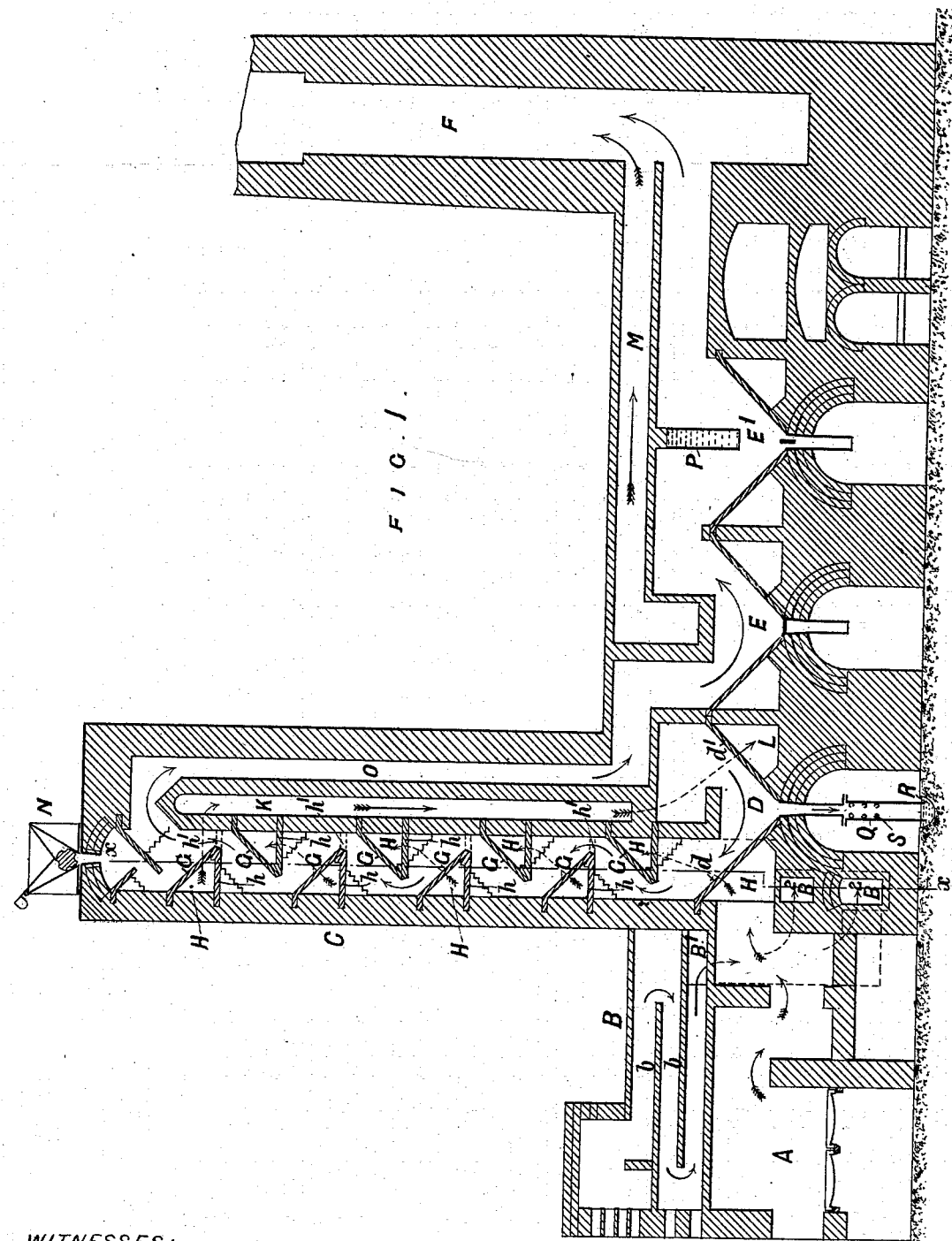

UNITED STATES PATENT OFFICE.

CHARLES JAMES FAUVEL, OF LONDON, ENGLAND.

METHOD OF TREATING REFRACTORY ORES.

SPECIFICATION forming part of Letters Patent No. 503,839, dated August 22, 1893.

Application filed January 31, 1893. Serial No. 460,287. (No specimens.)

*To all whom it may concern:*

Be it known that I, CHARLES JAMES FAUVEL, assayer and mining engineer, of 15 George Street, Mansion House, in the city of London, England, have invented new and useful Improvements in the Method of Treating Refractory Ores, of which the following is a full, clear, and exact description.

This invention relates to a method of systematically treating refractory ores containing precious and other metals, for the purpose of more effectually oxidizing the associated sulphur, arsenic, antimony, and tellurium compounds and of eliminating them in a vaporized or sublimed condition by subjecting the crushed ore in the form of a fine free-falling stream to a progressively increasing degree of radiant heat concurrently with the action of a reversely-flowing current of hot air, the operation being so conducted that neither the air nor the ore shall be contaminated with furnace gases and being preferably combined with the operation of quenching the ore in water in such manner that the steam thereby generated mixes with the air and becomes decomposed in the presence of the oxidizable constituents of the ore, thus promoting the oxidizing and "sweetening" action. This method of treatment is carried out preferably by means of a furnace which forms the subject of Letters Patent of the United States granted to me March 7, 1893, and numbered 493,076, but it is not limited to this particular construction of furnace as other forms of furnace may possibly be devised by which the same effects may be produced.

For convenience of description I will here repeat the description of the aforesaid furnace as I have found it best suited to my purpose, with reference to the accompanying drawings, forming part of this specification, wherein—

Figure 1 is a longitudinal sectional elevation of the entire furnace. Fig. 2 is a vertical section, on line *x—x* Fig. 1. Fig. 3 is a central detail section looking in the reverse direction to Fig. 1. Fig. 4 is a sectional elevation, on a larger scale, through the ore-quenching spout.

The furnace comprises a fireplace A, an air-heater B, an oxidizing tower C, settling chambers D, E, E', a chimney F, and the various flues and adjuncts hereinafter referred to. The oxidizing tower C is a rectangular brick structure fitted internally with a series of inclined fireclay slabs G each extending the full width of the oxidizing chamber and projecting alternately from opposite sides thereof and being so arranged with regard to each other that the pulverized ore supplied in a continuous manner by an automatic feeder N extending across the whole width of the oxidizing chamber at the top thereof, will flow down the inclined surfaces of the slabs and be delivered from each to the highest part of the slab next below in a broad thin, continuous stream, the supply being preferably so regulated that there is but a thin layer of particles flowing down the slabs so that the particles will roll upon the heated surfaces of the slabs and all will be equally and progressively heated and exposed to the oxidizing and desulphurizing effects of the air and of the steam (which is generated by the quenching of the incandescent ore as hereinafter described) the intensity of the heat, the purity of the air, and the oxidizing effect, gradually increasing as the stream of ore approaches the lower part of the tower. The ore after undergoing the said treatment, is received in a hopper-shaped chamber D whence it is discharged in a highly-heated state through a vertical shaft Q, the oxidized and volatilized impurities having by this time been carried off as more fully described hereinafter. The gases from the fireplace A enter the flue beneath the inclined side *d* of the receiving hopper D and, following the course indicated by the feathered arrows, pass through the horizontal flues H inclosed by the horizontal slabs *h* beneath the inclined slabs G in succession from the lowest upward, the said flues H being connected in zig-zag order by vertical flues H' interrupted by cross-partitions *h'* in the end walls of the tower, the highest flue H leading into a central downtake flue K communicating by a cross-flue L beneath the other inclined side *d'* of the hopper D with a flue M leading to the chimney F, and none of these flues have any connection with the interior of the oxidizing tower.

The air heater B is divided by baffles *b* to expose an extended area of heating surface to the air admitted in a regulated manner ereto, the heated air passing thence, as indicated by the featherless arrows, through lateral and cross-flues B', B², B³, into the receiving hopper D whence it flows up through the whole height of the oxidizing tower and thence to a downtake flue O leading to the series of settling and condensing chambers E, E', where it is exposed to contact with a metal tank P cooled by a circulation of cold water, the air and uncondensed vapors finally passing to the chimney F. The discharge spout Q dips into a trough R containing running water and is sealed thereby, while within the spout are perforated pipes S which extend along the two long sides of the spout Q whose width is equal to the full width of the hopper D and of the oxidizing chamber. From these pipes issue downwardly and upwardly-directed jets of cold water which meet and cross each other from opposite sides so that the free-falling stream of incandescent particles must pass through the water jets and become quenched while the steam thereby generated ascends through the chamber D into the oxidizing tower where it becomes decomposed by the heat in contact with the highly-heated ore, thus assisting the oxidizing and desulphurizing action, the sulphur of the ore combining with the hydrogen and forming sulphureted hydrogen which passes off with the air. The ore supplied as above described to the top of the oxidizing chamber becomes gradually heated by radiation and conduction as it flows down through the chamber and over the inclined slabs until on reaching the bottom of the tower it is brought to an incandescent condition. During its downward passage and progressive heating, the ore meets the upwardly-flowing current of highly-heated air by which the oxidizable and volatile impurities of the ore are oxidized in a gradual or progressive manner and carried off in the direction opposed to the action of gravity so that but little of the solid particles will be liable to be carried off along with the fumes. The air is in its purest and most highly heated condition when it first meets the ore which at this moment attains its highest temperature and most nearly purified condition so that the culminating points of the heating and oxidation coincide, while the steam generated by the quenching of the ore mingles with the air and promotes the oxidation and desulphurization of the ore as above mentioned. By the quenching of the glowing particles of ore and the disruptive effect produced by the flashing of the water into steam, the particles are broken up and any adherent skin of oxide of the base metals becomes detached.

I claim—

The herein described method of treating refractory ores, which consists in subjecting the same in the form of a continuously-falling fine stream, first, to a progressively increasing degree of radiated and conducted heat and concurrently therewith to the oxidizing and desulphurizing action of a continuous current of pure hot air and steam flowing in the opposite direction to the falling stream of ore, and then while the particles of ore are in an incandescent condition quenching them in cold water, thereby splitting up the particles, removing adherent scale, and generating steam for assisting the oxidizing and desulphurizing action of the air, the said oxidizing and desulphurizing operations being performed out of contact with furnace gases, as described.

Dated this 2d day of January, 1893.

CHARLES JAMES FAUVEL.

Witnesses:
T. W. KENNARD,
B. C. DIXON,
Clerks to A. M. & W. Clark, Patent Agents, 53 Chancery Lane, London.